J. SOSS.
WINDOW FRAME FOR AUTOMOBILE HOODS AND THE LIKE.
APPLICATION FILED OCT. 17, 1919.
1,364,460. Patented Jan. 4, 1921.
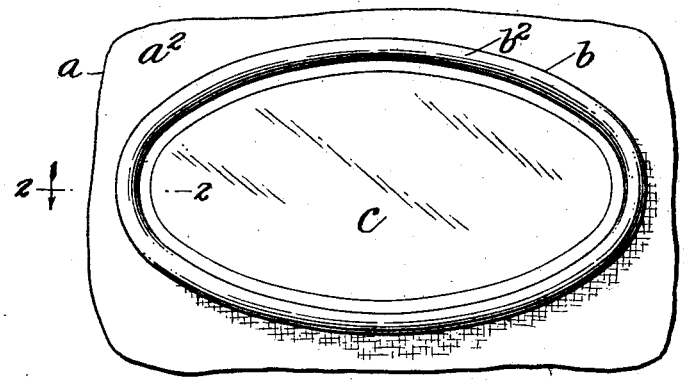
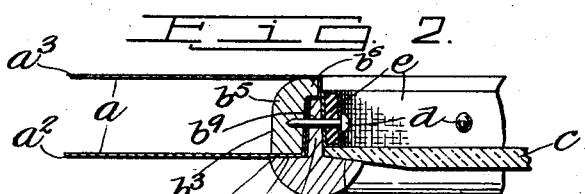
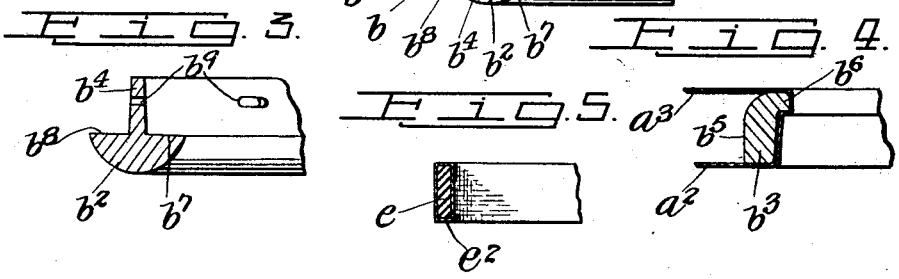
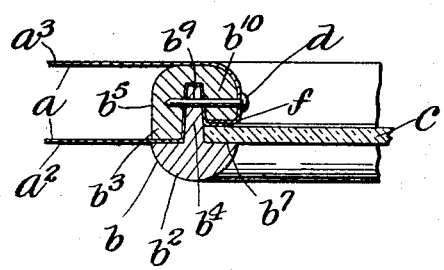
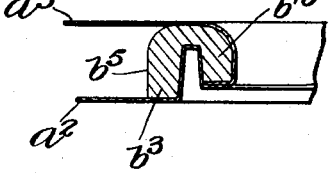
Inventor
Joseph Soss,
By his Attorneys

UNITED STATES PATENT OFFICE.

JOSEPH SOSS, OF NEW YORK, N. Y.

WINDOW-FRAME FOR AUTOMOBILE-HOODS AND THE LIKE.

1,364,460.  Specification of Letters Patent.  Patented Jan. 4, 1921.

Application filed October 17, 1919. Serial No. 331,349.

*To all whom it may concern:*

Be it known that I, JOSEPH SOSS, a citizen of the United States, and residing at New York, in the county of New York and State of New York, have invented certain new and useful Improvements in Window-Frames for Automobile-Hoods and the like, of which the following is a specification; such as will enable those skilled in the art to which it appertains to make and use the same.

This invention relates to windows or window frames for use in connection with the hoods, curtains and the like of automobiles or other vehicles, and the object of the invention is to provide a frame of the class specified which is particularly adapted for use in connection with flexible hoods, curtains and the like of automobiles or similar vehicles composed of two sheets of fibrous or other flexible material, the construction and arrangement of the frame being such as to facilitate the connection of the separate sheets of the hood therewith, or the securing of the frame in connection with the hood material; a further object being to provide a frame of the class specified which is simple in construction, comparatively inexpensive and efficient in use; and with these and other objects in view the invention consists of a window frame of the class specified, constructed as hereinafter described and claimed.

The invention described and claimed herein is an improvement on that described and claimed in a prior application filed by me January 30, 1919, Serial No. 273,933, and said invention is fully disclosed in the following specification, of which the accompanying drawing forms a part, in which the separate parts of my improvement are designated by suitable reference characters in each of the views, and in which:—

Figure 1 is an outside view of a part of the hood of an automobile with my improved window frame secured therein;

Fig. 2 a section on the line 2—2 of Fig. 1;

Fig. 3 a view similar to Fig. 2 but showing only one part of the frame;

Fig. 4 a view similar to Fig. 2 but showing the other part of the frame with both parts of the hood applied thereto;

Fig. 5 a sectional view of a part of a securing band which I employ;

Fig. 6 a view similar to Fig. 2 but showing a modification; and,

Fig. 7 a view similar to Fig. 4 of a part of a frame shown in Fig. 6.

In the drawing forming part of this specification, I have shown at $a$ a part of the hood of an automobile, and this hood comprises an outer part $a^2$ and an inner part $a^3$, and the outer part $a^2$ is composed of a sheet of leather or any other suitable fibrous material, while the inner part $a^3$ is preferably composed of a sheet of any suitable fibrous material and may be of any desired color.

In the practice of my invention I provide a window frame $b$ which, in the construction shown, is elliptical in form, but which may be of any desired shape or form, and said frame is composed, in the construction shown, of a main body portion comprising an outer annular member $b^2$ and an inner annular member $b^3$.

The outer annular member $b^2$ is composed of metal and comprises a body portion which is plano-convex in cross section except that the plane side thereof is provided with an annular web $b^4$ which extends therearound and projects therefrom, and the inner member $b^3$ of the frame is preferably composed of wood or other fibrous material and comprises a body portion $b^5$ adapted to closely fit the outer face of the web $b^4$ and is provided at the outer edge thereof, in the construction shown, with an inwardly directed annular flange $b^6$ which overlaps the web $b^4$, as clearly shown in Fig. 2.

The web $b^4$ divides the plain face of the member $b^2$ of the frame into an inner plane annular supplemental face $b^7$ and an outer plane annular supplemental face $b^8$, and the face $b^7$ forms a ledge or support against which the glass or other transparent panel $c$ is placed in assembling the parts of the frame and completing the same.

In mounting the frame in the hood of the automobile, a suitable aperture or opening similar to the form of the frame is formed in the hood parts $a^2$ and $a^3$, said aperture or opening being of less dimensions than the dimensions of the frame, and the outer hood part $a^2$ or the material thereof around the aperture therein is folded around the inner wall of the body $b^5$ of the member $b^3$ of the frame and fits between said body portion $b^5$ of the member $b^3$ of the frame and the annular supplemental face $b^8$ of the member $b^2$ of the frame when said parts of the frame are assembled. The part $a^3$ of the hood, or the material thereof, around the aperture therein is folded around the inner wall of the body $b^5$ of the member $b^3$ of the frame and around the annular flange $b^6$ at the top of the member $b^3$ as clearly shown in Fig. 2, after which the member $b^3$ of the frame is pressed onto the member $b^2$ and fits around the web portion $b^4$ thereof, or the member $b^2$ may be forced into the member $b^3$ as clearly shown in Fig. 2, and in this operation that portion of the hood parts $a^2$ and $a^3$ around the apertures therein are securely bound between the frame members $b^2$ and $b^3$.

I also provide a panel holding and finishing member $e$ consisting of an inner flexible band which is shown detached in Fig. 5, and said band consists of flexible material and is provided with a cover $e^2$ of fibrous material similar in color to that of the inner part $a^3$ of the hood, and in assembling the parts of the frame and securing the transparent panel $c$ therein, the nails or other fastening devices $d$ are driven through said band and through the web $b^4$ of the member $b^2$ of the frame and into the member $b^3$, or the part $b^5$ thereof, and said band $e$ serves to hold the panel $c$ in position and covers and conceals the web $b^4$ of the outer part $b^2$ of the frame and overlaps slightly the outer edge portion of said web as shown in Fig. 2, and said band thus serves to hold the panel $c$ in position and also forms a neat and attractive finish for the inner part of the frame.

In order to facilitate the driving of the nails $d$ through the web portion $b^4$ of the outer frame member $b^2$, said web portion is provided with slots $b^9$ as shown in Fig. 3, but my invention, as shown in Figs. 1 to 5 inclusive, is not limited to the particular means employed for connecting the parts of the frame, but I prefer the means shown and described.

With my improvement the frame is composed of two parts only between which the separate parts of the hood are securely bound, and said parts of the frame or one of them also serves to space the parts of the hood and hold them in proper relative position, and with said parts constructed and connected as described there will be no twisting or crimping of the hood parts nor sagging of the frame in the hood, but said frame will be evenly supported at all times without danger of disconnection from the hood or the separation of its parts.

In Figs. 5 and 6 I have shown a modification in which the inner frame member $b^3$ consists of the outer part $b^5$ and an inner annular part $b^{10}$, said parts being separated by a deep annular groove which receives the web member $b^4$ of the outer member $b^2$ of the frame, and when the parts are connected as shown in Fig. 6, the transparent panel $c$ fits between the inner annular face $b^7$ of the member $b^2$ of the frame and the inner annular part $b^{10}$ of the member $b^3$ of the frame, as clearly shown.

In assembling the parts of the frame and connecting said frame with, or securing it in the hood, the outer hood part $a^2$ is folded over the web portion $b^4$ of the frame member $b^2$, while the inner hood part $a^3$ is passed over the outer portion of the frame member $b^3$ and inwardly and around the inner side part $b^{10}$, of said frame member, as clearly shown in Fig. 6 and portions of the hood part $a^2$ and the hood part $a^3$ fit between the part $b^{10}$ of the frame member $b^3$ and the transparent panel $c$ as clearly shown at $f$ in Fig. 6, and this cushions the transparent panel $c$ securely and binds it in position. The nails or other fastening devices are driven outwardly through the part $b^{10}$ of the inner frame member $b^3$, through the web $b^4$ of the outer frame member $b^2$ and into the outer body part of the outer frame member $b^3$ as clearly shown in said figure.

With my improvement it will be seen that the main body part of the frame in the construction shown in Figs. 1 to 5 inclusive is composed of two frame parts, the annular flexible band member $e$ serving only to secure the transparent panel $c$ in position and as a finish to the frame, while with the construction shown in Figs. 6 and 7 the entire frame is composed of two parts only, the transparent panel $c$ being bound between portions of the said two parts of the frame, and with this construction, it will also be apparent that the parts of the hood will not be crimped or twisted, or torn, or injured in any way by the frame, or in the operation of securing the frame in the hood, or connecting the hood with the frame, and by employing two hood portions or parts as shown and described, the window or window frame will be evenly supported at all times in the hood and will not sag in the hood or cause the displacement or crimping or twisting of any part of said hood.

Having fully described my invention, what I claim as new and desire to secure by Letters Patent, is:—

1. A window frame of the class described for use in connection with a hood, curtain or the like of an automobile or other vehicle, said hood, curtain or the like being composed of inner and outer sheets of flexible material, said frame comprising inner and outer members, the outer member being composed of a body portion plano-convex in cross section excepting that the plane surface thereof is provided with a central web which projects therefrom and extends therearound, and an inner flexible band adapted to closely fit said web and the inner and outer parts of the hood, curtain or the like being securely bound between the inner and outer members of the frame and said members and the flexible band being secured together by fastening devices passed outwardly through said band through the web of the outer member of the frame and into the outer part of the inner member of the frame.

2. A window frame of the class described for use in connection with a hood, curtain or the like, composed of inner and outer sheets of flexible material, said frame comprising inner and outer members, the outer member being composed of a body portion approximately plano-convex in cross section, the plane surface thereof being provided with a web which projects therefrom and extends therearound, and the inner member being formed to closely fit said web, and means for supporting a transparent panel in the frame, the inner and outer sheets of the hood, curtain or the like being mounted between the inner and outer members of the frame, and said frame members being secured together by fastening devices passed transversely therethrough and which securely bind the inner and outer sheets of the hood in position.

In testimony that I claim the foregoing as my invention I have signed my name in presence of the subscribing witnesses this 14th day of October 1919.

JOSEPH SOSS.

Witnesses:
C. E. MULREANY,
H. E. THOMPSON.